(12) United States Patent
Whittenberger et al.

(10) Patent No.: US 9,573,106 B2
(45) Date of Patent: Feb. 21, 2017

(54) INSTALLATION TOOLS FOR STRUCTURED CATALYSTS

(71) Applicant: Catacel Corp., Ravenna, OH (US)

(72) Inventors: William A. Whittenberger, Leavittsburg, OH (US); Joseph W. Whittenberger, Ravenna, OH (US)

(73) Assignee: Johnson Matthey Public Limited Company, London (GB)

( * ) Notice: Subject to any disclaimer, the term of this patent is extended or adjusted under 35 U.S.C. 154(b) by 158 days.

(21) Appl. No.: 14/291,396

(22) Filed: May 30, 2014

(65) Prior Publication Data

US 2014/0356109 A1    Dec. 4, 2014

Related U.S. Application Data

(60) Provisional application No. 61/829,584, filed on May 31, 2013.

(51) Int. Cl.
| | | |
|---|---|---|
| *B23P 19/027* | (2006.01) | |
| *B01J 8/00* | (2006.01) | |
| *B01J 19/32* | (2006.01) | |

(52) U.S. Cl.
CPC ............... *B01J 8/002* (2013.01); *B01J 8/008* (2013.01); *B01J 8/0015* (2013.01); *B01J 19/32* (2013.01);
(Continued)

(58) Field of Classification Search
CPC .... B23P 19/025; B25B 27/026; B25B 27/064; Y10T 29/5383
See application file for complete search history.

(56) References Cited

U.S. PATENT DOCUMENTS

| | | | | |
|---|---|---|---|---|
| 5,918,355 A | * | 7/1999 | Sasaki | ..................... F15B 1/103 |
| | | | | 29/243.57 |
| 7,891,076 B2 | * | 2/2011 | Schmitt | ................ B05C 13/025 |
| | | | | 242/571.1 |

(Continued)

FOREIGN PATENT DOCUMENTS

| | | |
|---|---|---|
| EP | 2140933 A1 | 1/2010 |
| JP | 05285398 A | 11/1993 |

(Continued)

OTHER PUBLICATIONS

International Search Report and Written Opinion dated Sep. 23, 2014 for PCT/US2014/040211.

*Primary Examiner* — Lee D Wilson
(74) *Attorney, Agent, or Firm* — Pearne & Gordon LLP; Kevin M. Carroll

(57) ABSTRACT

A reactor installation tool and method for installing reactor components in a reactor housing. A reactor installation tool can include a push unit having a central aperture traversing its entire length and a push rod, a housing gripper having a center open section traversing its entire length and an expandable bladder positioned adjacent the center open section for securing the housing gripper inside a reactor housing. Reactor components can be installed by first lowering reactor components into a reactor housing, then lowering the reactor installation tool into the reactor housing above the reactor components, and then inflating the expandable bladder such that the expandable bladder contacts an inside surface of the reactor housing to secure the housing gripper inside the reactor housing.

14 Claims, 3 Drawing Sheets

(52) U.S. Cl.
CPC ............... *B01J 2208/00752* (2013.01); *B01J 2219/32275* (2013.01)

(56) References Cited

U.S. PATENT DOCUMENTS

2007/0025893 A1    2/2007  Whittenberger et al.
2014/0356109 A1*   12/2014 Whittenberger ......... B01J 8/002
                                                    414/293

FOREIGN PATENT DOCUMENTS

JP    2005246301 A    9/2005
KR    20120033390 A   4/2012

\* cited by examiner

INSTALLATION TOOLS FOR STRUCTURED CATALYSTS

This application claims the benefit of U.S. Provisional Application No. 61/829,584, filed May 31, 2013, which is incorporated herein by reference in its entirety.

FIELD

The present invention relates to methods of installing structured catalysts, and the tools used to perform the same, and in particular, to reactor installation tools for installing components suitable for use in a reactor housing.

BACKGROUND

Reactors, such as those used in the field of surface catalytic reactions and heat exchange, can fit within a reactor tube, which can transfer heat from the reactor tube to the interior of the tube or the reactor unit contained therein, or from the interior of the tube or reactor unit to the reactor tube. One example of a reactor unit is a stackable structural reactor, or SSR.

The reactor installation tools described herein can be used with any style of reactor, such as cylindrical, cone, or rectangle-shaped reactors. Most commonly, the reactors are cylindrical-shaped tube reactors. Reactor components can occupy substantially all of the space within a reactor tube and/or press firmly against the interior wall of the reactor tube. Installation of reactor components can cause damage, such as denting portions of the reactor tube or other components, for example, the fins of a reactor. Other damage can be caused, for example, scratching or bending the reactors, which can negatively affect performance, such as the heat transfer or reaction rate. Installation of reactor components must be done in a consistent and repeatable manner to insure ideal reactor performance, even when reactor tubes are inconsistent. This requires that installation tools must perform consistently. The dimensions of a reactor, and clearance available at the reactor opening(s), can also limit the type of installation tools that are available. Use of bulky and expensive tools for installing components in small or compact reactors not only increases installation time and costs but also heightens the risk of damage to the reactor. Thus, there is a need for installation tools that are inexpensive, have a low profile, and are capable of installing the reactor components consistently in a reactor tube while avoiding damage to the reactor components or reactor housing. The present invention focuses on such installation tools and the use of these tools.

SUMMARY

The present invention provides reactor installation tools and methods for the installation of reactor components. The reactor installation tools can include a push unit and a housing gripper. The push unit can have a central aperture traversing its entire length and a push rod, which can also have a through hole along its entire length. The housing gripper can have a center open section traversing its entire length and an expandable bladder positioned adjacent the center open section for securing the housing gripper inside a reactor housing, such as a reactor tube. Optionally, the installation tool can include a standoff positioned between the push unit and the housing gripper. The standoff can have an open center section traversing its entire length so the through hole in the push rod and the center open section in the housing gripper are open to one another, such as being in register so the reactor installation tool has a continuous opening along its entire length for accessing the reactor components.

A method for installing reactor components can include the steps of lowering reactor components into a reactor housing, then lowering a reactor installation tool, or segments thereof, into the reactor housing wherein the tool is positioned above the reactor components. The reactor installation tool can include a push unit having a central aperture traversing its entire length and a push rod having a top end and a bottom end and a housing gripper having a center open section traversing its entire length and an expandable bladder. The expandable bladder can be inflated such that it contacts an inside surface of the reactor housing to secure the housing gripper inside the reactor housing. The push unit can have a center cavity for receiving fluid that acts to actuate the push rod to contact and move one or more reactor components inside the reactor housing. Fluid can be supplied to the center cavity through an upper inlet port and/or a lower inlet port depending on whether the push rod is extended or retracted.

BRIEF DESCRIPTION OF THE DRAWINGS

The following figures illustrate various aspects of one or more embodiments of the present invention, but are not intended to limit the present invention to the embodiments shown.

DETAILED DESCRIPTION

As used herein, when a range such as 5-25 is given, this means at least or more than 5 and, separately and independently less than or not more than 25. Materials of construction for the reactor installation tool, or any component or part thereof, can include any suitable material, for example, metal, non-ferrous metal, metal foil, steel, stainless steel, alloys, non-metals such as plastics or glass, ceramic, rubber, polymer materials or combinations thereof and the like.

Reactor installation tools that are low profile, small and compact and adaptable to various reactor designs and dimensions are described below. The compact design and low height of each segment of the reactor installation tool allows for insertion into reactor housings that have low or limited clearance access at the openings. The tools can optionally utilize an air "blast" function and therefore can be used on reactor components that can be positioned and/or expanded with compressed gas. The tools are preferably inexpensive to manufacture and mechanically simplistic such that there are minimal complex components. Such tool characteristics result in an easy to use, low cost, lightweight, efficient tool that is portable to any location and can be left behind if desired.

Figure 1:
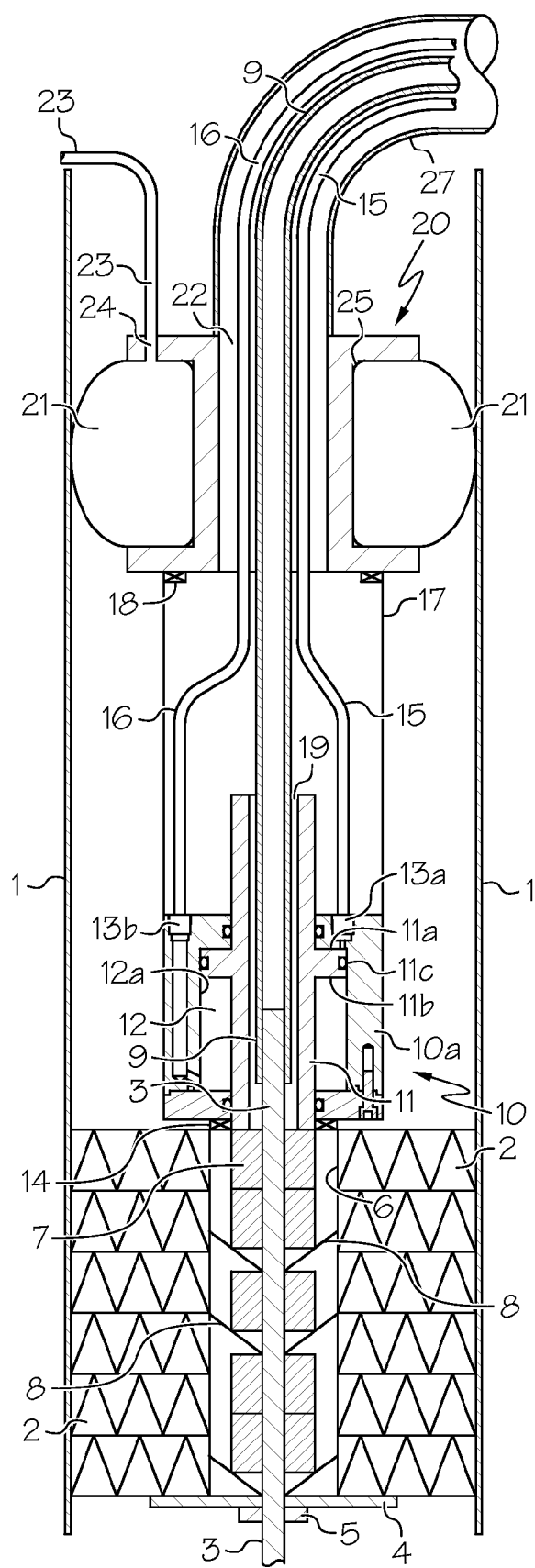
FIG. 1 shows a cross-section view of a reactor installation tool arranged in a reactor housing for use with one or more reactor components located in the housing.

Turning to the figures, FIG. 1 shows a reactor installation tool positioned above reactor components inside a reactor housing 1 such that the tool can be actuated to contact and push on or move one or more of the components for installation purposes. For example, pushing on reactor components can aid in the desirable positioning and expansion of the components to maintain consistent reactor performance over the life of the unit. The reactor housing described herein can have any dimension and shape, such as a reactor tube or cylinder having a diameter in the range of 2 to 20 inches. Preferably, in the case of a reactor tube or cylinder, the housing can have a diameter in the range of 2 to 15, more preferably in the range of 2.5 to 10, still more preferably in the range of 3 to 6 inches.

The reactor components in FIG. 1 can be seen as forming a stackable structural reactor, or SSR. The components include a cylindrical post 3 that centrally extends along the longitudinal axis of the reactor housing 1. Stacked arrangements of expansion weights 7 and expansion cones 8 can be positioned on the post 3. Preferably, the stacked arrangements can slide along the post such that the expansion weights can slide and push on the expansion cones 8 to increase the diameter of the cones and push the remaining components, inner tube 6 and fans 2, outward to the reactor housing 1.

Surrounding the post 3, expansion weights 7, and expansion cones 8 is an expandable inner tube 6 having an inner and outer surface. The expansion cones 8 can be in continuous contact with the inner surface of the inner tube. Extending radially from and in constant contact with the outer surface of the expandable inner tube is one or more sets of fans 2 that can be stacked on top of each other. To prevent the reactor components from sliding off the post 3, the post 3 can have a stop plate 4 secured by a bolt 5 or otherwise, for example by welding, along its length near or at its bottom end as shown.

The reactor installation tool includes at least two segments that can be inserted into a reactor housing 1, either in combination or separately. Once the segments are positioned in the reactor housing 1, they function together to interact with and position reactor components as desired during installation or periodic maintenance. The first segment can be a push unit 10. The second segment can be a housing gripper 20. An optional third segment can be a standoff 17.

Figure 2:
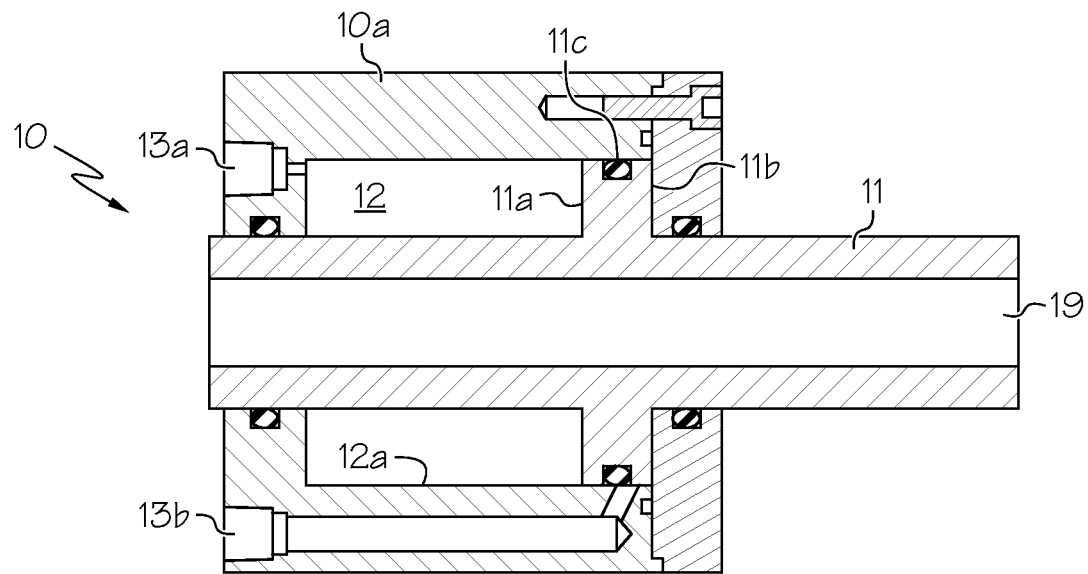
FIG. 2 shows a cross-section view of a push unit segment of a reactor installation tool capable of being arranged in a reactor housing.

As can be seen in FIGS. 1 and 2, the first segment, push unit 10, can have a through hole or central aperture 19 for permitting air hoses and the like to extend through the unit 10 to contact one or more reactor components positioned below the unit 10 in the reactor housing 1. The push unit 10 has a push rod 11 that can be actuated in a first and second direction, shown as up and down in the Figures, with the use of fluid, such as compressed gas or non-compressible liquid, to contact and push on one or more reactor components, for example, an expansion weight 7. The housing 10a of the push unit 10 can have a cavity 12 located within an interior region of the unit. A portion of the push rod 11 is located within and fills a part of the cavity 12 and can travel up and down within the cavity 12. As shown, the portion of the push rod 11 within the cavity 12 can have a top surface 11a and a bottom surface 11b for contacting fluid in the cavity for purposes of actuating the push rod.

Fluid supply lines 15, 16 can be connected to the push unit, for example to the housing 10a as shown, at inlet ports to supply fluid, such as compressed gas, to the center cavity 12. As fluid is received in the cavity 12 and the cavity becomes filled, the fluid pushes on the push rod to actuate movement of the rod up and down. Inlet ports are open at one end to the cavity 12 portion of the push unit housing and the other opposing end of the inlet ports is open to the fluid supply line. In one embodiment, supply line 15 supplies fluid through inlet port 13a that pushes the push rod in a first direction (e.g., down as shown) to contact one or more reactor components. To actuate the push rod in the first direction, fluid received in the cavity 12 from supply line 15 contacts the top surface 11a of the portion of the push rod in the cavity. Supply line 16 supplies fluid to the cavity 12 through inlet port 13b that pushes the push rod 11 in a second direction, opposite of the first direction, for example up and away from the reactor components as shown. To actuate the push rod in the second direction, fluid received in the cavity from supply line 16 contacts the bottom surface 11b of the portion of the push rod in the cavity.

The portion of the push rod in the cavity can include, between the top surface 11a and bottom surface 11b, a seal 11c that contacts the inner wall 12a of the cavity. The seal 11c can isolate the region of the cavity 12 above the top surface 11a from the region below the bottom surface 11b to permit fluid received in either region from entering the other region such that the push rod 11 is actuated by the fluid in a first or second direction. The seal 11c can be a ring as known in the art.

The push rod 11 of the push unit 10 can have an open center section 19 that traverses its entire length. The open center section can accommodate the post 3 and/or tubing 9 such that as the push rod travels towards the post 3 and extends over and around the post 3 and into the interior region of the expandable inner tube 6 to contact a reactor component, such an expansion weight 7.

As shown, the push rod 11 can extend downward to contact and push downward on an expansion weight 7 slidably arranged on the post 3. The directional force on the expansion weight 7 can act to slide the weight 7 along the post to push and expand cones 8 and fans 2 radially outward towards the reactor housing 1. The cones 8 can radially push against the inner tube 6 that contacts the fans 2. The radial force on the inner tube 6 from the cones 8 can further radially expand the tube 6 and push on the fans 2. The fans 2 can then be pushed radially outward towards the inner surface of the reactor housing 1. The fans 2 can contact the reactor housing or limited by a predetermined spacing from the reactor housing surface, such as by a spacer or the like (not shown). During operation, the push unit 10, for example the bottom of the housing 10a, can rest on the reactor components in the reactor housing 1, such as the top surface of the inner tube 6 or on the top fan 2. Optionally, a seal 14 can be used and is attached to the housing 10a on its bottom surface. If present, the seal 14, rather than the push unit 10, can rest on the inner tube 6. Alternatively, in another embodiment, the seal 14 can be arranged on the bottom surface of the housing 10a such that the seal 14 fits inside the inner tube 6 and contacts the inner surface of the tube 6 to prevent air leakage. The seal 14 is preferably designed to be expandable such that it interacts and remains in continuous contact with the inner surface of the tube 6 as the tube radially expands outward. An example, not shown, is a skirt type of seal that has flexible end that extends into the inner tube 6 and easily flaps outward with the expanding inner tube. The seal 14 can be used to isolate the interior region of the reactor between the inner tube and outer diameter of the post 3. The seal 14 is optional and can be used during a compressed gas blast to the interior region for expanding and/or moving reactor components.

The push unit 10 can be sized to fit into tight areas, such as a low access clearance area at the opening of a reactor housing 1. The push unit can have a height in the range to 2 to 15, preferably 2 to 12 and more preferably 2 to 10 inches or about 3, 4, 5, 6, 7, 8, 9 inches. The low-profile design of the push unit allows it to be inserted into the reactor housing when the top clearance or access area above the housing is less than 20, 15 or 10 inches. The push rod 11 can have a travel distance in the cavity 12 of about 1 to 8 inches, preferably 1 to 6 and more preferably 1 to 4 inches or about 2 or 3 inches. The open center section 19 of the push rod 11 can have a width of less than one inch or more preferable in the range of 0.5 to 1 inch.

Figure 3:
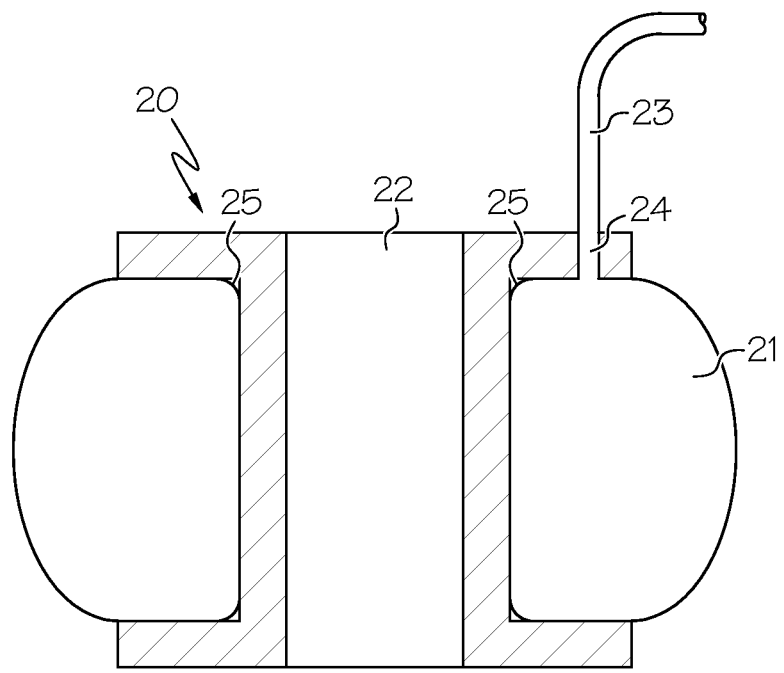
FIG. 3 shows a cross-section view of a housing gripper segment of a reactor installation tool capable of being arranged in a reactor housing.

The second segment, housing gripper 20, can be positioned above the push unit 10 in the reactor housing 1 to provide a fixed, non-movable segment when secured to the reactor housing by an expandable bladder 21. The housing gripper 20 prevents the push unit 10 from moving towards the gripper 20 and away from the reactor components as the push rod 11 moves towards and pushes against a reactor component. This is accomplished by a series of load transfers, with gripper 20 first transferring the push load to the tube wall. Subsequently, the load path flows to the expansion weights that can slide along the post, then to the inner tube that is expanded outward and further onto the base of the stacked reactor components and remaining stacks in the reactor housing. As can be seen in FIGS. 1 and 3, the housing gripper 20 has a center open section 22 that traverses the entire length of the housing gripper that allows for various air tubes, compressed gas/fluid lines and the like to pass through the center. The housing gripper 20 can be low-profile in that it can have a height in the range to 3 to 15, preferably 3 to 12 and more preferably 3 to 10 inches or about 4, 5, 6, 7, 8, 9 inches. The center open section 22 of the housing gripper 20 can have a width of less than one two inches or more preferable in the range of 0.75 to 1.5 inch.

To secure the gripper 20 in a fixed, non-moveable position in the reactor housing, the housing gripper 20 can have one or more expandable bladders 21. The one or more expandable bladders are flexible and can accommodate various reactor dimensions when inflated. The expandable bladder can be made of any suitable material, such as rubber, fabric, polymeric materials and the like. The housing gripper can have one expandable bladder, as shown in FIG. 1, that traverses most of the length of the gripper, for example, at least 50, 60, 70, 80, 90 or more percent of the length. Optionally, as shown in FIGS. 4A-4C, the housing gripper can have 2, 3, 4, 5, 6 or more expandable bladders for securing the housing gripper in the reactor housing.

One or more hoses 23 can supply fluid, such as compressed gas, to the bladder 21 to pressurize and inflate the bladder so that the bladder contacts and presses securely on the inner surface of the reactor housing. As shown, fluid or compressed gas from the one or more hoses 23 is fed to the bladder through feed holes or ports 24 in the housing gripper, for instance near its top section. The housing gripper can have a recessed portion 25 along its outer surface for housing a portion of the expandable bladder 21. The expandable bladder 21 can be secured to the recessed portion 25 by conventional techniques, such as an adhesive. Alternatively, no additional securing means are used. Rather, the pressure added upon inflation acts to secure the expandable bladder in place within the recessed portion 25. The expandable bladder 21 can extend entirely around the housing gripper center section 22 for instance in the recessed portion. Positioned on the outer diameter surface of the housing gripper, for instance in the recessed portion, the expandable bladder is adjacent the center open section traversing the length of the gripper. When inflated, the bladder can center and secure the housing gripper 20 inside the reactor housing 1. The expandable bladder 21 is inflated such that a portion of the surface of the bladder maintains continuous contact with the inside surface of the reactor housing to secure the housing gripper 20 in a non-moveable, fixed position within the housing 1. The housing gripper 20 can be unsecured from inside the reactor housing by deflating the expandable bladder 21 to release it from being in contact with the inner surface of the reactor housing.

Figure 4A:
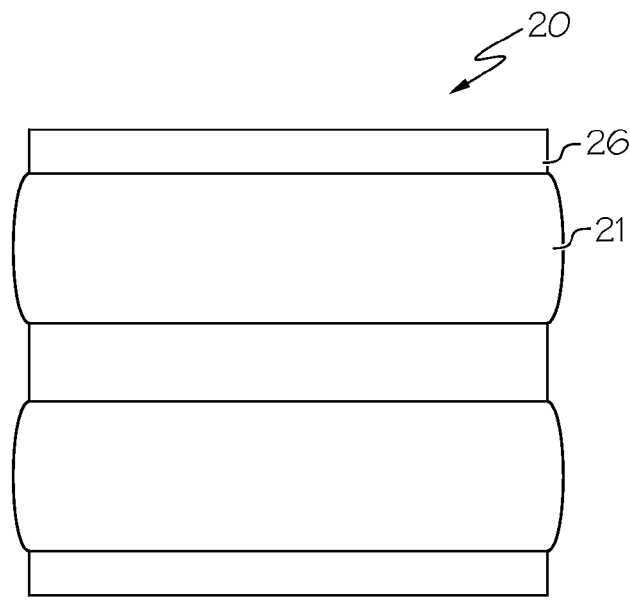
FIG. 4A shows a perspective view of a housing gripper segment of a reactor installation tool having two expandable bladders.
Figure 4B:
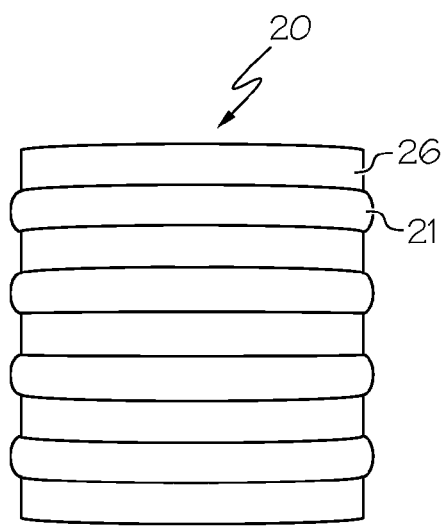
FIG. 4B shows a perspective view of a housing gripper segment of a reactor installation tool having four expandable bladders.
Figure 4C:
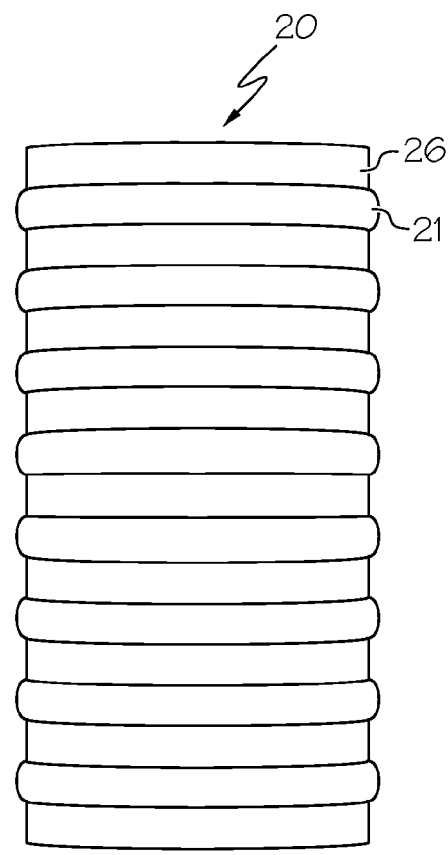
FIG. 4C shows a perspective view of a housing gripper segment of a reactor installation tool having eight expandable bladders.

FIGS. 4A-4C show additional configurations for the housing gripper 20 using more than one expandable bladder 21. All of these configurations can be adapted to have a center opening section that traverses the entire length of the housing gripper for permitting air tubes and the like to pass through. The housing gripper 20 can have 2, 3, 4, 5, 6, 7 or 8 expandable bladders that can be used to grip the inner wall surface of a reactor housing for securing the housing gripper into position. As shown, the housing gripper can have 2, 4 or 8 expandable bladders 21. The expandable bladders 21 can be spaced apart by sections of the housing gripper 20 to form spacer gaps 26 between each expandable bladder. One or more hoses 23 can supply fluid, such as compressed gas, to the bladders 21 to pressurize and inflate the bladders so that each bladder contacts and presses securely on the inner surface of the reactor housing. Fluid or compressed gas from the one or more hoses 23 is fed to the bladders through one or more ports 24 in the housing gripper 20. For instance, one port 24 in the housing gripper 20 can be used to inflate all of the bladders should the bladders be in fluid connection with one another. Alternatively, each bladder can have a fluid port for inflating.

The housing gripper 20 can have a multiple recessed portions along its outer surface, wherein each recessed portion houses a portion of one expandable bladder 21. As previously noted, the expandable bladders 21 can be secured to the recessed portion by conventional techniques, such as with an adhesive or with the pressure added upon inflation, which acts to secure the expandable bladder 21 in place within the recessed portion 25. The expandable bladders 21 can extend entirely around the housing gripper center section, for instance in the recessed portion.

Optionally, turning back to FIG. 1, if a blast of compressed gas is to be supplied to the interior region of the reactor for expanding and/or moving reactor components, a blow hose 27 can be directly attached to the top surface of the housing gripper 20 along the edge of the center hole. The blow hose 27 is preferably aligned and in register with the center section of gripper 20 and can surround tubes and hoses, such as air tube 9, and fluid supply lines 15 and 16, that pass through the open center section of the installation tool.

Also as shown, the reactor installation tool can also have an optional third segment, a standoff 17, between the housing gripper 20 and push unit 10. As shown, along its top end, the push unit 10 can have a standoff 17 that rests against or is secured to the unit. The standoff 17 can be a separate piece from the push unit 10 or directly secured to the push unit 10, for example by welding or bolting, to be an integral structural component of the push unit 10. Alternatively, it could be secured to the housing gripper 20, or to both segments. The standoff 17 provides an extension and open section between the push unit 10 and the housing gripper 20 for accommodating fluid lines and hoses and for providing space for the push rod 11 when it is in the refracted position and extends outward or above the push housing 10*a*. Preferably, the housing gripper 20 and push unit 10 are in direct contact with the top and bottom ends of the standoff 17, respectively. The standoff 17, being in contact with the housing gripper 20, allows the push unit 10 to push against a fixed, non-movable object, such as the housing gripper 20, positioned above as the push rod 11 extends into the interior region of the reactor to contact and push on reactor components. An example of a standoff is a section of pipe. As shown, supply lines 15 and 16 pass through its center along with flexible hosing piece 9 that is used to lower reactor components stacked on the post 3. At its top end, the standoff 17 can have a seal 18 to prevent compressed gas from leaking out between the standoff 17 and housing gripper 20 during a compressed gas blast to the interior region of the reactor. The standoff 17 can have any desirable height, for example, in the range of 2 to 10 inches. Preferably, the standoff 17 has a height to accommodate the distance the push rod 11 extends away from the push housing 10*a* while the push rod is in the retracted position (i.e. not in contact with a reactor component).

Insertion of the reactor installation tool in the reactor housing as shown in FIG. 1, can be done in pieces or segments to accommodate low clearance access to the reactor housing. In order, the push unit 10, optionally the standoff 17, and the housing gripper 20 can each be lowered into the reactor housing to provide a stacked arrangement to create the reactor installation tool. Prior to the reactor installation tool segments being lowered into the reactor housing 1, the stack of fans 2 on the post 3 is lowered in with the use of the flexible hose 9 fitted around the top end portion of the post. The flexible hose 9 can extend through the central aperture of the push unit and center open section of the housing gripper.

To facilitate the insertion/lowering of installation tool segments into the reactor housing 1, each segment can have securing means, such as a hook or eye bolt, for attaching a rope, chain, or other hauling means for lowering the segments into the reactor housing. The same securing and hauling means can also be used to remove the segments from the reactor housing. Once the reactor installation tool segments are inserted into the reactor housing 1, the push unit 10 and housing gripper 20, and optionally the standoff 17, can be secured to one another such that the through hole in the push rod and the center open section in the housing gripper are in register to create a continuous opening along the entire length of the reactor installation tool. After the reactor installation tool segments are in place, the expandable bladder 21 is inflated to secure the housing gripper 20 into a fixed, non-movable position inside the reactor housing. Fluid can be supplied to the expandable bladder 21 by one or more hoses 23 through one or more ports 24. Once the housing gripper 20 is secured, the push rod 11 can be actuated. As noted above, supply line 15 can supply fluid to the cavity through inlet port 13*a* to contact the top surface 11*a* of the portion of the push rod in the cavity 12 such that the fluid pushes the push rod 11 in a first direction (e.g., down) to contact one or more reactor components. As the push rod 11 extends downward, it can contact and push downward on an expansion weight 7, which can facilitate the positioning of the reactor components in the reactor housing 1, as described above.

Optionally, compressed gas can be blasted into an interior region of the reactor prior to the push rod coming into contact with a reactor component. The compressed gas blast can be utilized to pressurize the interior region of the reactor housing in the inner expandable tube 6 and expand it and the adjacent fans 2 towards the inner surface of the reactor housing. The compressed gas will initially enter the reactor tube through the blow hose 27 and subsequently pass through the housing gripper 20 open section, optionally the interior region of the standoff 17, and finally the center open section 19 of the push unit 10 before arriving at the interior region of the reactor housing in the expandable tube 6. During the blast, the push unit 10 or optionally the seal 14 is resting on the SSR to create a seal. After a compressed air blast, the push rod 11 can be actuated to further position reactor components as desired, for example, if the compressed gas blast did not achieve the desired amount of expansion or push on the reactor components.

Once the reactor components have been installed and positioned, compressed gas can be supplied to the flexible hose 9 to release the hose from the post, such that the flexible hose 9 pops off the post 3. Subsequently, the reactor installation tool, or individual segments thereof, can be removed. As described above, the tool or each segment can have securing means, such as a hook or eye bolt, for attaching a rope, chain, or other hauling means for raising/pulling the tool or segments out of the reactor housing. In order, the housing gripper 20, optionally the standoff 17, and the push unit 10 are each pulled out of the reactor housing 1. Prior to pulling the segments out of the reactor housing 1, the push rod 11 can be actuated to extend upwards away from the reactor components and the post 3. As noted above, supply line 16 can supply fluid to the cavity 12 through inlet port 13*b* to contact the bottom surface 11*b* of the portion of the push rod in the cavity such that the fluid pushes the push rod 11 in a second direction (e.g., up; away from the reactor components). The expandable bladder 21 is also deflated to release the housing gripper 20. Deflating can occur by simply removing the pressure from the hose 23, or preferably by applying a slight vacuum to the air hose to reduce the time needed to deflate. Optionally, instead of using a rope or chain attached to a securing means for pulling the housing gripper out of the reactor housing, hose 23 can be used.

As noted above, each of the segments of the reactor installation tools can be operated using a fluid. The fluid can be, for example compressed gas, such as air, nitrogen or steam, or for example compressed liquid, such as water or oil. Other fluids that can be envisioned within the invention are also contemplated.

While various embodiments in accordance with the present invention have been shown and described, it is understood the invention is not limited thereto, and is susceptible to various changes and modifications as known to those skilled in the art. Therefore, this invention is not limited to the details shown and described herein.

What is claimed is:

1. A reactor installation tool comprising:
   a push unit having a central aperture traversing an entire length of the push unit and a push rod; and
   a housing gripper having a center open section traversing an entire length of the housing gripper and an expandable bladder positioned adjacent the center open section for securing the housing gripper inside a reactor housing.

2. The reactor installation tool of claim 1 further comprising a standoff having a top end and a bottom end, wherein the standoff is positioned between the push unit and the housing gripper and has an open center section traversing an entire length of the standoff.

3. The reactor installation tool of claim 2, wherein the standoff is secured to the push unit.

4. The reactor installation tool of claim 2, wherein the standoff is secured to the housing gripper.

5. The reactor installation tool of claim 2, wherein the standoff comprises a seal around the top or bottom end of the standoff.

6. The reactor installation tool of claim 1, wherein the expandable bladder extends entirely around the center open section of the housing gripper.

7. The reactor installation tool of claim 1, wherein the housing gripper comprises between 2 and 8 expandable bladders.

8. The reactor installation tool of claim 1, wherein the push unit is positioned below the housing gripper inside the reactor housing.

9. The reactor installation tool of claim 1, wherein the push unit further comprises a center cavity for receiving fluid, wherein fluid is supplied to the center cavity by an upper inlet port and a lower inlet port for moving the push rod.

10. The reactor installation tool of claim 9, wherein a portion of the push rod is located within the center cavity such that the fluid supplied to the upper inlet port acts to move the push rod one direction and the fluid supplied to the lower inlet port acts to move the push rod in a second direction.

11. The reactor installation tool of claim 1, wherein the housing gripper further comprises a port for supplying fluid to the expandable bladder.

12. The reactor installation tool of claim 1, wherein the expandable bladder has a port for receiving fluid.

13. A reactor installation tool comprising:
a push unit comprising:
a push rod having a through hole traversing an entire length of the push rod,
a center cavity for receiving fluid through an upper inlet port or a lower inlet port in the push unit,
one or more fluid supply lines connected to the upper inlet port or lower inlet port;
a housing gripper comprising:
a center open section traversing an entire length of the housing gripper,
an expandable bladder positioned adjacent the center open section,
wherein the push unit and housing gripper are secured to one another and the through hole in the push rod and the center open section in the housing gripper are in register such that the reactor installation tool has a continuous opening along an entire length of the reactor installation tool.

14. The reactor installation tool of claim 13, the tool further comprising a standoff positioned between the push unit and housing gripper.

* * * * *